United States Patent
Pwu et al.

(10) Patent No.: US 7,791,910 B2
(45) Date of Patent: Sep. 7, 2010

(54) FLYBACK CONVERTER WITH SYNCHRONOUS RECTIFIER CAPABLE OF REDUCING POWER LOSS

(75) Inventors: Jong-Wei Pwu, Taoyuan (TW); Yang-Sheng Sun, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 419 days.

(21) Appl. No.: 11/740,098

(22) Filed: Apr. 25, 2007

(65) Prior Publication Data
US 2008/0043497 A1    Feb. 21, 2008

(30) Foreign Application Priority Data
Aug. 15, 2006    (TW) .............................. 95129986 A

(51) Int. Cl.
*H02M 3/335*    (2006.01)
(52) U.S. Cl. .................. 363/21.14; 363/21.06; 363/127
(58) Field of Classification Search .............. 363/21.06, 363/21.14, 89, 127
See application file for complete search history.

(56) References Cited

U.S. PATENT DOCUMENTS

| | | | |
|---|---|---|---|
| 3,940,682 A * | 2/1976 | Park et al. .................... | 363/127 |
| 6,366,478 B1 * | 4/2002 | Brakus ....................... | 363/21.06 |
| 6,462,965 B1 * | 10/2002 | Uesono .................... | 363/21.14 |
| 6,597,592 B2 * | 7/2003 | Carsten ....................... | 363/127 |
| 7,123,489 B2 * | 10/2006 | Park et al. ................. | 363/21.14 |
| 7,167,384 B2 * | 1/2007 | Yasumura ................... | 363/127 |
| 7,372,710 B2 * | 5/2008 | Kyono ...................... | 363/21.14 |
| 7,548,436 B1 * | 6/2009 | Chen ........................ | 363/21.04 |
| 2005/0068792 A1 * | 3/2005 | Yasumura ................ | 363/21.06 |

* cited by examiner

*Primary Examiner*—Jeffrey L Sterrett

(57) ABSTRACT

Disclosed is a flyback converter with a synchronous rectifier, in which the synchronous rectifier includes a synchronous switch, a current transformer connected in series between a drain terminal of the synchronous switch and an output terminal, and a secondary synchronous rectification driver connected to the gate terminal of the synchronous switch. Furthermore, a shunt resistor is connected in parallel with the current transformer for providing a current bypass path for a secondary current flowing through the synchronous switch and the current transformer, and thereby reducing the current flowing through the current transformer. Thus, the overall efficiency of the flyback converter can be enhanced and the life of the current transformer can be prolonged.

10 Claims, 2 Drawing Sheets

FLYBACK CONVERTER WITH SYNCHRONOUS RECTIFIER CAPABLE OF REDUCING POWER LOSS

FIELD OF THE INVENTION

The present invention is related to a flyback converter, and more particularly to a flyback converter with a synchronous rectifier, in which the synchronous rectifier includes a current transformer for initiating the synchronous rectification and a shunt resistor connected in parallel with the current transformer.

BACKGROUND OF THE INVENTION

FIG. 1 shows a flyback converter having a synchronous rectification function according to the prior art. As shown in FIG. 1, a flyback transformer TF has a primary winding Np11 having one end connected to a rectified input DC voltage Vin and another end connected to a drain terminal of a main switch MS which is implemented by a MOS transistor. A primary switch circuit 11 is connected to a gate terminal of the main switch MS and configured to issue pulse signals to control the switching operations of the main switch MS. When the main switch MS is turned on, the primary winding Np11 receives an input current I1 from an input terminal and thus stores energy in the primary winding Np11. In the meantime, a synchronous switch SS that is implemented by a MOS transistor and connected to a second secondary winding Ns12 of the flyback transformer TF is turned off through a secondary synchronous rectification driver 13 which is connected to a first secondary winding Ns11. Next, when the main switch MS is turned off, the synchronous switch SS is turned on through the secondary synchronous rectification driver 13 so that the energy stored in the primary winding Np11 is transferred to the secondary side of the flyback transformer TF, thereby inducing a high-frequency AC voltage across the second secondary winding Ns12 and causing a secondary current to flow through the synchronous switch SS. Here, the secondary synchronous rectification driver 13 is driven by the driving voltage provided by the first secondary winding Ns11, and the first secondary winding Ns11 and the second secondary winding Ns12 are connected in series with each other. The secondary synchronous rectification driver 13 is configured to perform switch operations in synchronization with the primary switch circuit 11, so that the synchronous switch SS can function as a rectifier. With the repeated switch operations of the synchronous switch SS, the high-frequency AC voltage induced across the second secondary winding Ns12 can be rectified into a desired DC voltage. This desired DC voltage will be filtered by an output capacitor Cout so as to generate an output DC voltage Vout which is provided to a load (not shown).

Also, the flyback converter of FIG. 1 further includes a current transformer 14 which is connected in series between the drain terminal of the synchronous switch SS and an output terminal. The current transformer 14 has a primary winding 15 and a secondary winding 16 with a relatively large turn ratio (about 1:100). When the secondary current I2 flows through the primary winding 15, the secondary winding 16 will generate an output signal which is proportional to the current flowing through the primary winding 15. The output signal will be sent to the secondary synchronous rectification driver 13 so that the secondary synchronous rectification driver 13 can drive the synchronous switch SS to initiate the synchronous rectification process when a current with a correct polarity flows through the second secondary winding Ns12 and the synchronous switch SS. The flyback converter of FIG. 1 further includes a feedback control circuit 12 which is connected between an output terminal and the primary switch circuit 11. The feedback control circuit 12 is configured to detect variations on the output voltage of the flyback converter and in response thereto generate an error signal, thereby enabling the primary switch circuit 11 to stabilize the output voltage of the flyback converter at a predetermined level based on the error signal.

As is well known in the art, the current transformer 14 is a magnetic element. When the current transformer 14 is conducting currents, a considerable power supply will be generated due to the heated transformer. The power loss associated with the current transformer includes copper loss, iron loss, eddy current loss and hysteresis loss. These losses would degrade the efficiency of the flyback converter and deteriorate the isolative characteristic of the current transformer 14. Further, the life of the current transformer 14 would be shortened and the overall efficiency of the flyback converter would be limited.

SUMMARY OF THE INVENTION

An object of the present invention is to provide a flyback converter with a synchronous rectifier that can reduce the power loss of the current transformer employed in the synchronous rectifier.

According to a preferred embodiment, a power adapter having a synchronous rectifier, such as a flyback converter, is provided, including a transformer having a primary side and a secondary side; a main switch connected to the primary side; and a synchronous rectifier connected to the secondary side. The synchronous rectifier includes a synchronous switch, a synchronous rectifier driver connected to a control input terminal of the synchronous switch for manipulating the switching operations of the synchronous switch to accomplish the synchronous rectification process, a current transformer connected in series between the synchronous switch and an output terminal for sending a control signal to the synchronous rectifier driver to initiate the synchronous rectification process when the current flowing through the current transformer is a forward current, and a shunt resistor connected in parallel with the current transformer for providing a current bypass path to the current flowing through the current transformer. More specifically, the resistance of the shunt resistor is far smaller than the impedance of the current transformer.

Now the foregoing and other features and advantages of the present invention will be best understood through the following descriptions with reference to the accompanying drawings, wherein:

DETAILED DESCRIPTION OF THE PREFERRED EMBODIMENT

A preferred embodiment embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 1:
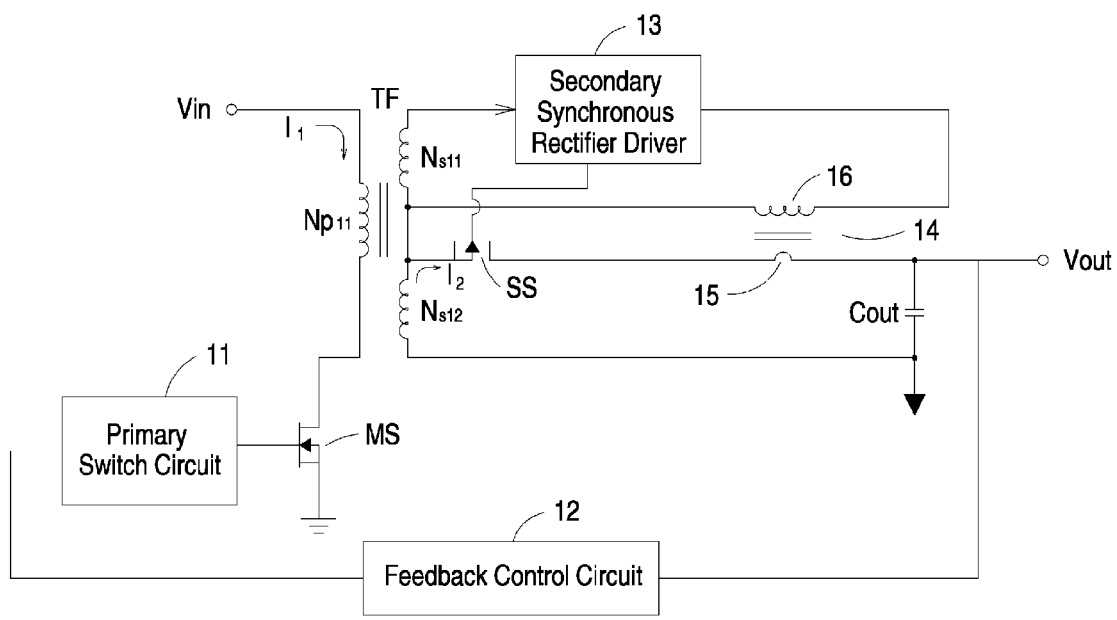
FIG. 1 is a circuit diagram showing a flyback converter with a synchronous rectifier according to the prior art.
Figure 2:
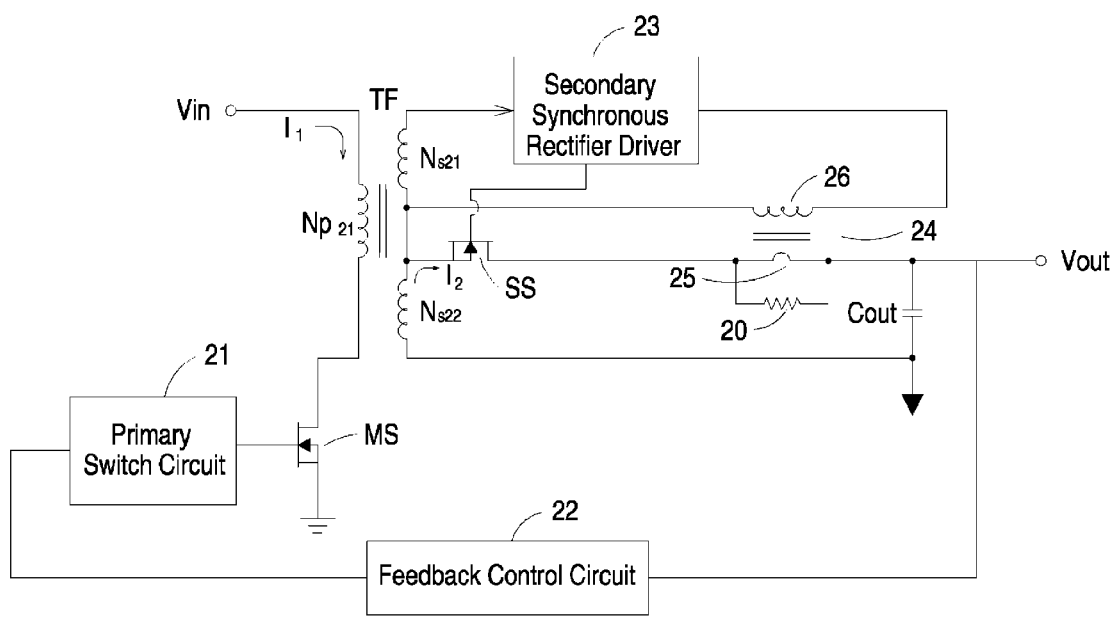
FIG. 2 is a circuit diagram showing a flyback converter with a synchronous rectifier according to a preferred embodiment of the present invention.

FIG. 2 shows a flyback converter having a synchronous rectification function according to a preferred embodiment of the present invention. It is to be noted that the same reference numeral denotes the same element throughout the present invention. As shown in FIG. 2, a flyback transformer TF has a primary winding Np21 having one end connected to a rectified input DC voltage Vin and another end connected to a drain terminal of a main switch MS. A primary switch circuit 21 is connected to the gate terminal of the main switch MS and configured to issue pulse signals to control the switch operations of the main switch MS. When the main switch MS is turned on, the primary winding Np21 receives an input current from an input terminal and stores energy from the rectified input DC voltage Vin in the primary winding Np21. In the meantime, a synchronous switch SS that is implemented by MOS transistors and connected to a second secondary winding Ns22 is turned off through a secondary synchronous rectifier driver 23 which is connected to a first secondary winding Ns21. Next, when the main switch MS is turned off, the synchronous switch SS will turn on through the secondary synchronous rectifier driver 23 so that the energy stored in the primary winding Np21 is transferred to the secondary side of the flyback converter, thereby inducing a high-frequency AC voltage across the second secondary winding Ns22 and causing a secondary current I2 to flow through the synchronous switch SS. Here, the secondary synchronous rectifier driver 23 is driven by a driving voltage provided by the first secondary winding Ns21, and the first secondary winding Ns21 and the second secondary winding Ns22 are connected in series with each other. The secondary synchronous rectifier driver 23 is configured to perform switch operations in synchronization with the primary switch circuit 21. Therefore, the synchronous switch SS functions as a rectifier. With the repeated switch operations of the synchronous switch SS, the high-frequency AC voltage across the second secondary winding Ns22 can be rectified into a desired DC voltage. This desired DC voltage is filtered by an output capacitor Cout so as to generate an output DC voltage Vout which is provided to a load (not shown).

Also, the flyback converter of FIG. 2 further includes a current transformer 24 which is connected between the synchronous switch SS and an output terminal. The current transformer 24 has a primary winding 25 and a secondary winding 26 with a relatively large turn ratio (about 1:100). When the secondary current I2 flows through the primary winding 25, the secondary winding 26 will generate an output signal which is proportional to the current flowing through the primary winding 25. The output signal is sent to the secondary synchronous rectifier driver 23 so that the secondary synchronous rectification driver 23 can drive the synchronous switch SS to initiate the synchronous rectification process when a current with a correct polarity flows through the second secondary winding Ns22 and the synchronous switch SS. The flyback converter of FIG. 2 further includes a feedback control circuit 22 which is connected between an output terminal and the primary switch circuit 21. The feedback control circuit 22 is configured to detect the variations on the output voltage of the flyback converter and in response thereto generate an error signal, thereby enabling the primary switch circuit 21 to stabilize the output voltage of the flyback converter at a predetermined level based on the error signal.

In addition, the flyback converter according to the present invention further includes a shunt resistor 20 which is connected in parallel with the current transformer 24. The shunt resistor 20 is a circuit element with a small resistance and is used for providing a current bypass path for the current flowing through the current transformer 24. When the synchronous switch SS is turned on, the secondary current I2 will be induced and flows through the synchronous switch SS and the current transformer 24. Because the resistance of the shunt resistor 20 is far smaller than the impedance of the current transformer 24, the majority of the secondary current I2 flows through the shunt resistor 20 and the minority of the secondary current I2 flows through the current transformer 24. Therefore, the power loss caused by the transformer characteristic as stated above can be reduced and the overall efficiency of the flyback converter can be enhanced. Further, the life of the current transformer 24 can be prolonged. It is noteworthy that the resistance of the shunt resistor 20 should be in reverse proportional to the current value of the secondary current I2. That is, the larger the current value of the secondary current I2 is, the smaller the resistance of the shunt resistor should be.

In conclusion, the present invention proposes a flyback converter with a synchronous rectifier, wherein the synchronous rectifier includes a current transformer for detecting if a secondary current flowing through the current transformer is a forward current. If it is detected that the secondary current flowing through the current transformer is a forward current, a control signal is issued to enable the secondary synchronous rectifier driver to issue gate driving signals to drive the synchronous switch, thereby initiating the synchronous rectification process. Besides, a shunt resistor is connected in parallel with the current transformer for bypassing the secondary current flowing through the current transformer, thereby reducing the power loss caused by the current transformer. Hence, the overall efficiency of the flyback converter is enhanced.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A power converter comprising:
   a transformer having a primary side and a secondary side; and
   a synchronous rectifier connected to the secondary side, comprising:
      a synchronous switch;
      a synchronous rectifier driver connected to a control input terminal for controlling the switch operations of the synchronous switch so as to accomplish a synchronous rectification process;
      a current transformer connected in series between the synchronous switch and an output terminal for sending a control signal to the synchronous rectifier driver to initiate the synchronous rectification process when a current flowing through the current transformer is a forward current; and
      a shunt resistor connected in parallel with a primary winding of the current transformer and connected in series with the output terminal for providing a current bypass path for the current flowing through the primary winding of the current transformer.

2. The power converter according to claim 1 wherein the power converter is a flyback converter.

3. The power converter according to claim 1 wherein a resistance of the shunt resistor is far smaller than an impedance of the current transformer.

4. The power converter according to claim 1 further comprising a main switch connected to the primary side of the transformer.

5. The power converter according to claim 4 further comprising a primary switch circuit connected to a control input terminal of the main switch for controlling the switch operations of the main switch.

6. The power converter according to claim 5 further comprising a feedback control circuit connected between the output terminal and the primary switch circuit for detecting variations on the output voltage of the power converter and in response thereto generating an error signal, thereby enabling the primary switch circuit to stabilize the output voltage of the power converter at a predetermined level based on the error signal.

7. The power converter according to claim 1 wherein the current transformer is configured to send the control signal through a secondary winding thereof.

8. The power converter according to claim 1 wherein the transformer has a first secondary winding and a second secondary winding.

9. The power converter according to claim 1 wherein the synchronous rectifier driver is connected to a secondary winding of the transformer.

10. The power converter according to claim 1 further comprising an output capacitor connected between the current transformer and the output terminal.

* * * * *